United States Patent
Fujishiro

(10) Patent No.: US 7,119,860 B2
(45) Date of Patent: Oct. 10, 2006

(54) LIGHT-REFLECTION TYPE LIQUID CRYSTAL DISPLAY DEVICE AND METHOD OF FABRICATING THE SAME WHEREIN THE POLARIZER HAS PARTICULAR EDGE ARRANGEMENT

(75) Inventor: Fumihiko Fujishiro, Tokyo (JP)

(73) Assignee: NEC Corporation, Tokyo (JP)

( * ) Notice: Subject to any disclaimer, the term of this patent is extended or adjusted under 35 U.S.C. 154(b) by 2 days.

(21) Appl. No.: 11/101,065

(22) Filed: Apr. 7, 2005

(65) Prior Publication Data

US 2005/0179834 A1    Aug. 18, 2005

Related U.S. Application Data

(62) Division of application No. 10/452,025, filed on May 30, 2003, now Pat. No. 6,891,587.

(30) Foreign Application Priority Data

May 30, 2002    (JP) .............................. 2002-157419

(51) Int. Cl.
    *G02F 1/1335* (2006.01)
(52) U.S. Cl. .......................... 349/96; 349/63; 349/113
(58) Field of Classification Search .................. 349/96, 349/58, 60–63, 113
    See application file for complete search history.

(56) References Cited

U.S. PATENT DOCUMENTS

| 6,417,897 B1 | 7/2002 | Hashimoto |
| 6,685,328 B1 | 2/2004 | Hanson et al. |
| 2004/0004424 A1 | 1/2004 | Sakurai |
| 2004/0150981 A1 | 8/2004 | Katsuda et al. |

FOREIGN PATENT DOCUMENTS

| JP | 7-199184 | 8/1995 |
| JP | 11-149252 | 6/1999 |
| JP | 11-219610 | 8/1999 |
| JP | 2000-147499 | 5/2000 |

*Primary Examiner*—Andrew Schechter
*Assistant Examiner*—Mike Qi
(74) *Attorney, Agent, or Firm*—Katten Muchin Rosenman LLP

(57) ABSTRACT

A light-reflection type liquid crystal display device includes (a) a liquid crystal display panel, (b) a polarizer mounted on the liquid crystal display panel, (c) a light-guide mounted on the polarizer, (d) a resin layer sandwiched between the polarizer and the light-guide for fixing the polarizer and the light-guide to each other, (e) a light-source arranged adjacent to an end of the light-guide for supplying light to the light-guide, and (f) a frame having a bottom and a wall defining an opening which has the same contour as that of the light-guide. The light-guide is positioned relative to the polarizer by being lowered along an inner wall of the frame through the opening onto the polarizer.

10 Claims, 11 Drawing Sheets

LIGHT-REFLECTION TYPE LIQUID CRYSTAL DISPLAY DEVICE AND METHOD OF FABRICATING THE SAME WHEREIN THE POLARIZER HAS PARTICULAR EDGE ARRANGEMENT

CROSS-REFERENCE TO RELATED APPLICATION

This application is a divisional of U.S. application Ser. No. 10/452,025 filed on May 30, 2003, now pending, the contents of which are herein wholly incorporated by reference.

BACKGROUND OF THE INVENTION

1. Field of the Invention

The invention relates to a liquid crystal display device and a method of fabricating the same, and more particularly to a light-reflection type liquid crystal display device and a method of fabricating the same

2. Description of the Related Art

Since a portable terminal device such as a portable computer can accumulate power in limited amount, parts constituting a portable terminal device are required to consume small power. Accordingly, not a display unit which can emit light by itself, but a liquid crystal display device which consumes small power is predominantly used as a display unit for a portable terminal device.

However, a liquid crystal display device does not have a function of emitting light by itself, and hence, has to include a light source. In accordance with a light-source, a liquid crystal display device is grouped into a light-reflection type liquid crystal display device, a light-transmission type liquid crystal display device, and a combination type liquid crystal display device.

A light-transmission type liquid crystal display device has a back-light source by which the device can display images.

A light-reflection type liquid crystal display device includes a light-reflector therein, and uses light entering into the device and reflecting at the light-reflector, as a light source. Hence, a light-reflection type liquid crystal display device is not necessary to include a back-light source unlike a light-transmission type liquid crystal display device.

A combination type liquid crystal display device includes a first section fabricated as a light-transmission type liquid crystal display device and a second section fabricated as a light-reflection type liquid crystal display device.

A light-reflection type liquid crystal display device consumes smaller power and can be fabricated thinner and lighter than a light-transmission type liquid crystal display device, and hence, is mainly used as a display unit for a portable terminal device. This is because a light-reflection type liquid crystal display device uses light entering thereinto and reflecting at a light-reflector for displaying images, and hence, is necessary to have a back-light source unlike a light-transmission type liquid crystal display device.

However, since a light-reflection type liquid crystal display device uses external light as a light source, it is difficult or almost impossible for a user to clearly see displayed images, if it is dark around the device.

In order to solve such a problem, a light-reflection type liquid crystal display device designed to include a preliminary light source which supplies light to the device through a light-guide has been suggested, for instance, in Japanese Patent No. 2699853 (Japanese Patent Application Publication No. 7-199184), and Japanese Patent Application Publications Nos. 11-149252, 11-219610 and 2000-147499.

FIG. 1 is a cross-sectional view of an example of a conventional light-reflection type liquid crystal display device including a preliminary light source.

A light-reflection type liquid crystal display device 100 illustrated in FIG. 1 is comprised of a liquid crystal display panel 101, a polarizer 102 lying on the liquid crystal display panel 101 in such a direction as facing a viewer, a light-guide 103 mounted on the polarizer 102, a resin layer 104 sandwiched between the polarizer 102 and the light-guide 103 for fixing them to each other, and a light source 105 located adjacent to an end of the light-guide 103, and supplying light to the liquid crystal display panel 101 through the light-guide 103. Though not illustrated, the light source 105 is usually surrounded by a cover (see FIG. 4C).

Light emitted from the light source 105 reaches the polarizer 102 through the light-guide 103, is polarized when passing through the polarizer 102, and reaches the liquid crystal display panel 101 to thereby be used for displaying images.

FIGS. 2A to 2D are cross-sectional views of the light-reflection type liquid crystal display device 100 illustrated in FIG. 1, illustrating respective steps of a method of fabricating the same.

First, as illustrated in FIG. 2A the polarizer 102 is mounted on the liquid crystal display panel 101, and then, liquid acrylic resin 104 which will be hardened when ultra-violet ray is irradiated thereto is dropped onto the polarizer 102.

Then, as illustrated in FIG. 2B, the light-guide 103 is mounted onto the polarizer 102. The resin 104 spreads wholly on the polarizer 102 due to a weight of the light-guide 103.

While the resin 104 is being extended, the light-guide 103 is positioned relative to the liquid crystal display panel 101, as illustrated in FIG. 2C.

Then, as illustrated in FIG. 2D, ultra-violet (UV) ray from which short-wave ultra-violet is cut is irradiated to the resin 104 through a glass filter 106 to thereby harden the resin 104.

Thus, the light-reflection type liquid crystal display device 100 illustrated in FIG. 1 is completed.

However, the above-mentioned method of fabricating the light-reflection type liquid crystal display device 100 is accompanied with the following problems.

The first problem is that a relative position and/or angle between the liquid crystal display panel 101 and the light-guide 103 is deviated from a desired position or angle while the resin 104 is being extended.

As a result, it is necessary to adjust the relative position before ultra-violet ray is irradiated to the resin 104, causing an increase in the number of fabrication steps and a time necessary for fabricating the liquid crystal display device 100.

The second problem is that, as illustrated in FIG. 3, the resin 104 often spreads beyond the polarizer 102 and covers the liquid crystal display panel 101 therewith.

The light-guide 103 and the polarizer 102 are generally composed of plastic. The resin 104 is selected among resin having a linear expansion coefficient close to that of the light-guide 103 and the polarizer 102, for instance, a linear expansion coefficient in the range of $3 \times 10^{-5}$ to $7 \times 10^{-5}$/degree. However, if the resin 104 spreads onto the liquid crystal display panel 101 as illustrated in FIG. 3, the resin 104 might be deformed at high or low temperature due to a difference in a linear expansion coefficient between the resin 104 and the liquid crystal display panel 101 composed of glass having a linear expansion coefficient of $5 \times 10^{-6}$/degree. As a result, the resin 104 might be peeled off at a portion at which the resin 104 is deformed.

SUMMARY OF THE INVENTION

In view of the above-mentioned problems in the conventional light-reflection type liquid crystal display device, it is an object of the present invention to provide a light-reflection type liquid crystal display device and a method of fabricating the same both of which are capable of preventing deviation in a relative position and/or angle between a liquid crystal display panel and a light-guide, or preventing a resin from being peeled off.

In one aspect of the present invention, there is provided a method of fabricating a light-reflection type liquid crystal display device including at least a liquid crystal display panel, a polarizer lying on the liquid crystal display panel, a light-guide lying on the polarizer, and a resin layer sandwiched between the polarizer and the light-guide for fixing the polarizer and the light-guide to each other, including the steps of (a) fixing the liquid crystal display panel on which the polarizer is mounted, onto a bottom of a frame having an opening which has the same contour as that of the light-guide, (b) dropping resin onto the polarizer, (c) lowering the light-guide along an inner wall of the frame through the opening onto the polarizer, and (d) hardening the resin.

In another aspect of the present invention, there is provided a light-reflection type liquid crystal display device including (a) a liquid crystal display panel, (b) a polarizer mounted on the liquid crystal display panel, (c) a light-guide mounted on the polarizer, (d) a resin layer sandwiched between the polarizer and the light-guide for fixing the polarizer and the light-guide to each other, (e) a light-source arranged adjacent to an end of the light-guide for supplying light to the light-guide, and (f) a frame having a bottom and a wall defining an opening which has the same contour as that of the light-guide, the light-guide being positioned relative to the polarizer by being lowered along an inner wall of the frame through the opening onto the polarizer.

It is preferable that the opening is larger than a contour of the light-guide by a predetermined length, in which case, the predetermined length may be equal to a tolerance allowable when the liquid crystal display panel and the light-guide are positioned relative to each other.

For instance, the liquid crystal display panel may be comprised of two substrates adhered to each other through adhesive, in which case, it is preferable that the frame is formed at a bottom thereof with an opening, and an inner edge of the opening is located more outwardly than the adhesive.

There is further provided that a light-reflection type liquid crystal display device including (a) a liquid crystal display panel, (b) a polarizer mounted on the liquid crystal display panel, (c) a light-guide mounted on the polarizer, (d) a resin layer sandwiched between the polarizer and the light-guide for fixing the polarizer and the light-guide to each other, (e) a light-source arranged adjacent to an end of the light-guide for supplying light to the light-guide, and (f) a frame having a bottom and a wall defining an opening which has the same contour as that of the light-guide, the polarizer having an edge extending outwardly beyond an edge of the light-guide, the wall of the frame having an outwardly projecting portion such that the polarizer can be accommodated in the frame, the light-guide being positioned relative to the polarizer by being lowered along an inner wall of the frame through the opening onto the polarizer.

There is still further provided a light-reflection type liquid crystal display device including (a) a liquid crystal display panel, (b) a polarizer mounted on the liquid crystal display panel, (c) a light-guide mounted on the polarizer, (d) a resin layer sandwiched between the polarizer and the light-guide for fixing the polarizer and the light-guide to each other, and (e) a light-source arranged adjacent to an end of the light-guide for supplying light to the light-guide, the polarizer having an edge extending outwardly beyond an edge of the light-guide.

It is preferable that the light-guide has a non-light-guide area along an outer edge thereof.

There is yet further provided a light-reflection type liquid crystal display device including (a) a liquid crystal display panel, (b) a polarizer mounted on the liquid crystal display panel, (c) a light-guide mounted on the polarizer, (d) a resin layer sandwiched between the polarizer and the light-guide for fixing the polarizer and the light-guide to each other, and (e) a light-source arranged adjacent to an end of the light-guide for supplying light to the light-guide, the polarizer having an edge extending outwardly beyond an edge of the liquid crystal display panel.

The advantages obtained by the aforementioned present invention will be described hereinbelow.

The present invention makes it possible to prevent a relative position and/or angle between a liquid crystal display panel and a light-guide from being deviated before a resin is hardened. Thus, it is no longer necessary to adjust the relative position and/or angle before ultra-violet ray is irradiated to a resin, preventing an increase in the number of fabrication steps and a time necessary for fabricating a liquid crystal display device.

In addition, the present invention makes it possible to prevent a resin from extending beyond a polarizer to a liquid crystal display panel while the resin is being extended, and hence, prevent the hardened resin from being peeled off.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 4A:
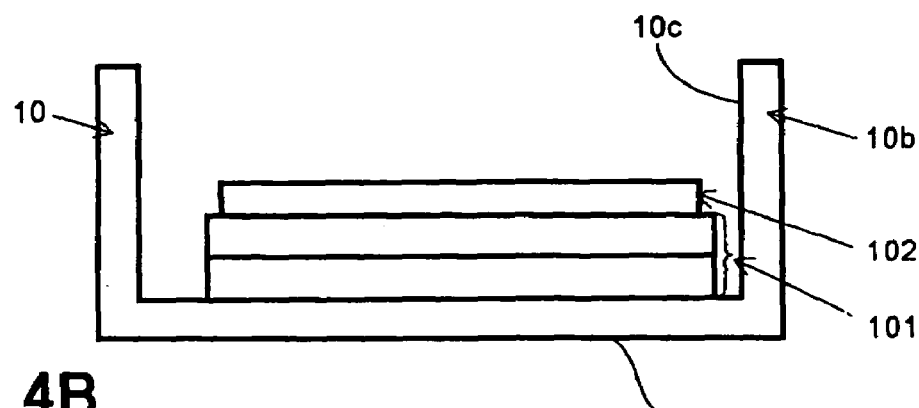
FIGS. 4A to 4C are cross-sectional views of a light-reflection type liquid crystal display device in accordance with the first embodiment, showing respective steps in a method of fabricating the same.
Figure 4B:
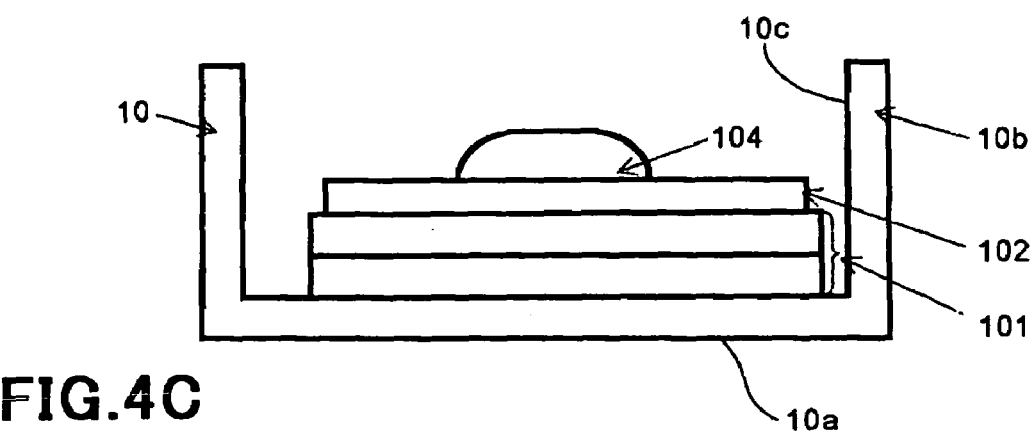
Figure 4C:
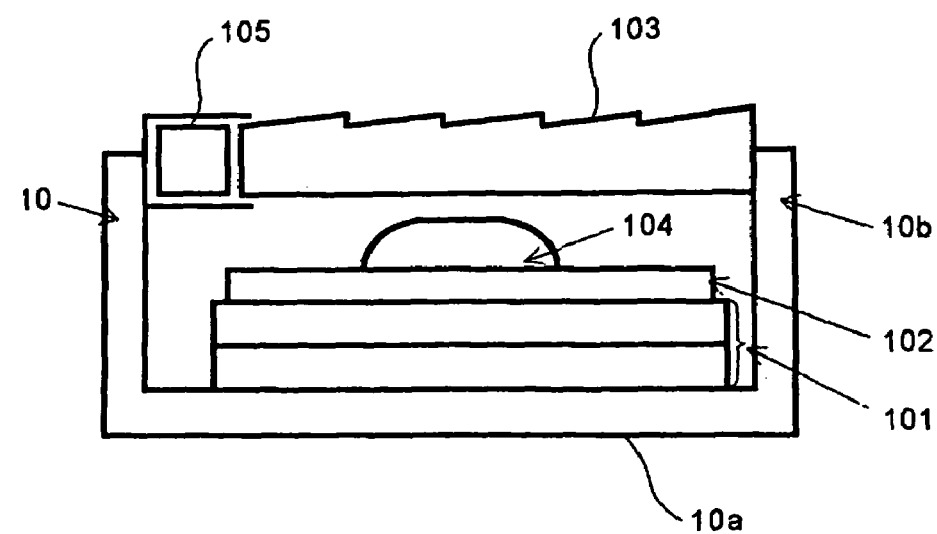

FIGS. 4A to 4C are cross-sectional views of a light-reflection type liquid crystal display device in accordance with the first embodiment, showing respective steps in a method of fabricating the same.

In the method, a frame 10 illustrated in FIG. 4A is used.

The frame 10 is comprised of a bottom 10a and a wall 10b standing perpendicularly upwardly from an outer edge of the bottom 10a. The wall 10b defines an opening 10c which is the same as or at least similar to a contour of the light-guide 103. The frame 10 is composed of plastic. As an alternative, the frame 10 may be composed of metal such as aluminum.

The light-reflection type liquid crystal display device in accordance with the first embodiment is fabricated as follows through the use of the frame 10.

First, the polarizer 102 is fixed onto the liquid crystal display panel 101. Then, as illustrated in FIG. 4A, the liquid crystal display panel 101 is fixed onto the bottom 10a of the frame 10, for instance, through adhesive or a double-sided adhesive tape. A position of the liquid crystal display panel 101 relative to the bottom 10a is determined taking a relative position between the liquid crystal display panel 101 and the light-guide 103 into consideration.

Then, as illustrated in FIG. 4B, the resin 104 composed of liquid acrylic resin which is hardened on irradiation of ultra-violet ray thereto is dropped onto the polarizer 102.

Then, as illustrated in FIG. 4C, the light-guide 103 is lowered downwardly along an inner wall of the wall 10b through the opening 10c towards the polarizer 102, and mounted on the polarizer 102.

Figure 1:
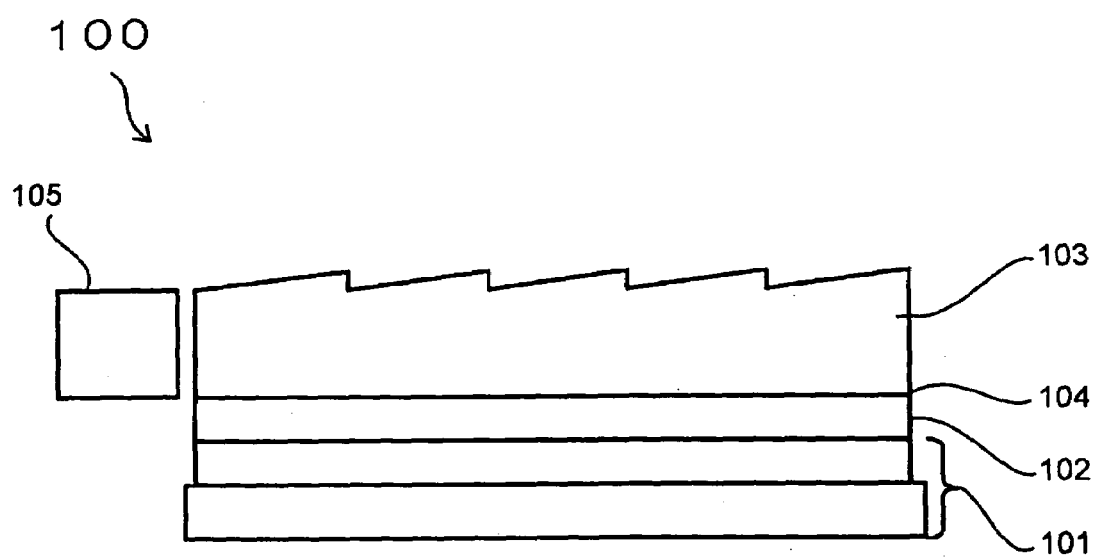
FIG. 1 is a cross-sectional view of a conventional light-reflection type liquid crystal display device.
Figure 2A:
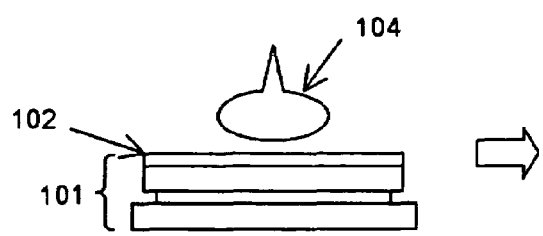
FIGS. 2A to 2D are cross-sectional views of the light-reflection type liquid crystal display device illustrated in FIG. 1, showing respective steps of fabricating the same.
Figure 2B:
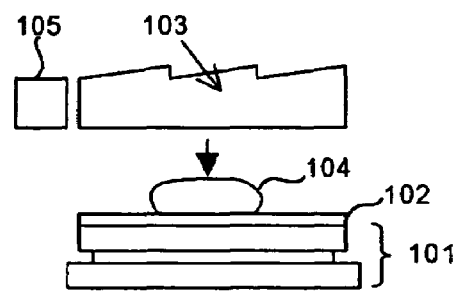
Figure 2C:
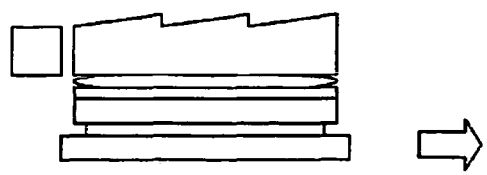
Figure 2C:
Figure 2D:
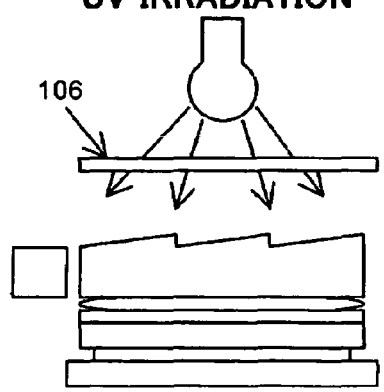

After the resin 104 has been extended over the polarizer 102 due to a weight of the light-guide 103, ultra-violet ray is irradiated to the resin 104 through a glass filter 106 (not illustrated in FIG. 4C, but see FIG. 2D) for hardening the resin 104.

In accordance with the first embodiment, the resin 104 spreads and is hardened with the light-guide 103 is kept positioned relative to the liquid crystal display panel 101. In the conventional method, a relative position and/or angle between the liquid crystal display panel 101 and the light-guide 103 might be deviated while the resin 104 is being extended. In contrast, the light-guide 103 is kept positioned relative to the liquid crystal display panel 101 in the first embodiment, and hence, a relative position and/or angle between them is not deviated. As a result, the method in accordance with the first embodiment enhances a yield in fabrication of a light-reflection type liquid crystal display device.

The frame 10 is not to be limited to such a structure as illustrated in FIG. 4A. It should be noted that the frame 10 may have modified structures as follows.

Figure 5:
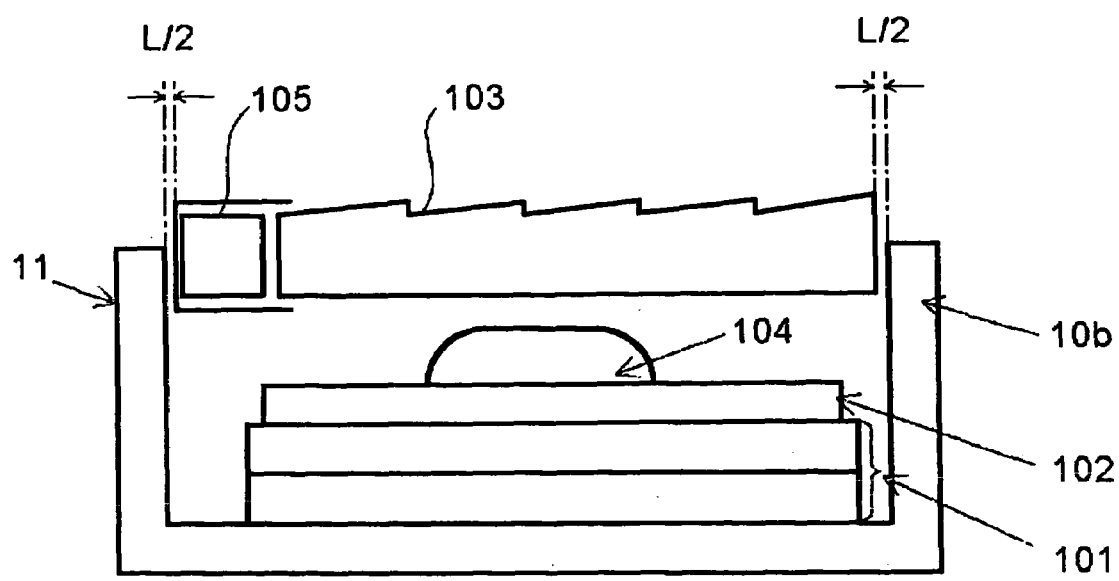
FIG. 5 is a cross-sectional view of a first variant of the light-reflection type liquid crystal display in accordance with the first embodiment.
Figure 6:
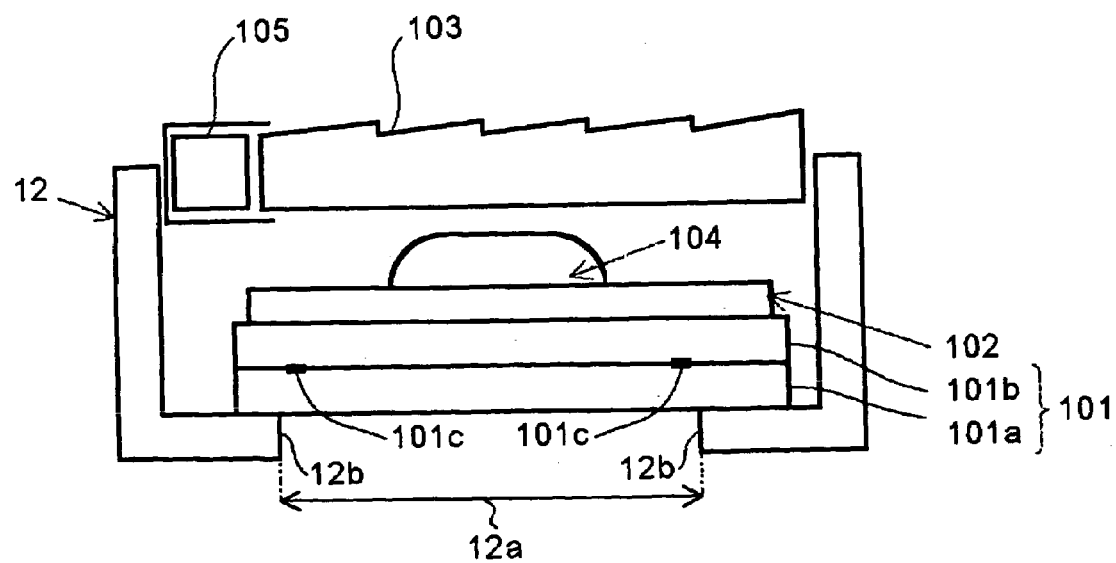
FIG. 6 is a cross-sectional view of a second variant of the light-reflection type liquid crystal display in accordance with the first embodiment.

FIG. 5 is a cross-sectional view of a frame 11 as a first variant of the frame 10.

The frame 11 is designed to have the opening 10c larger than a contour of the light-guide 103 by a predetermined length L.

For instance, if the liquid crystal display panel 101 is rectangular in size of 80 mm×60 mm, a positional tolerance between the liquid crystal display panel 101 and the light-guide 103 is about 0.5 mm, in which case, the predetermined length L may be equal to 0.5 mm.

FIG. 5 is a cross-sectional view of a frame 12 as a second variant of the frame 10.

The liquid crystal display panel 101 is comprised of two substrates 101a and 101b adhered to each other through adhesive tapes 101c.

The frame 102 is formed at the bottom 10a thereof centrally with a rectangular opening 12a such that an edge of the opening 12a is located more outwardly than the adhesive tapes 101c.

An operation panel (not illustrated) is arranged above the light-guide 103. A plurality of keys is arranged on the operation panel, and a user can operate the light-reflection type liquid crystal display device by actuating any key or keys. However, if oscillation generated when a user actuate a key is transferred to the liquid crystal display panel 101, a defectiveness may be caused in displaying images.

By forming the frame 12 at the bottom 10a thereof with the opening 12a, such oscillation is unlikely to be transferred to the liquid crystal display panel 101, ensuring reduction in the defectiveness.

[Second Embodiment]

Figure 7:
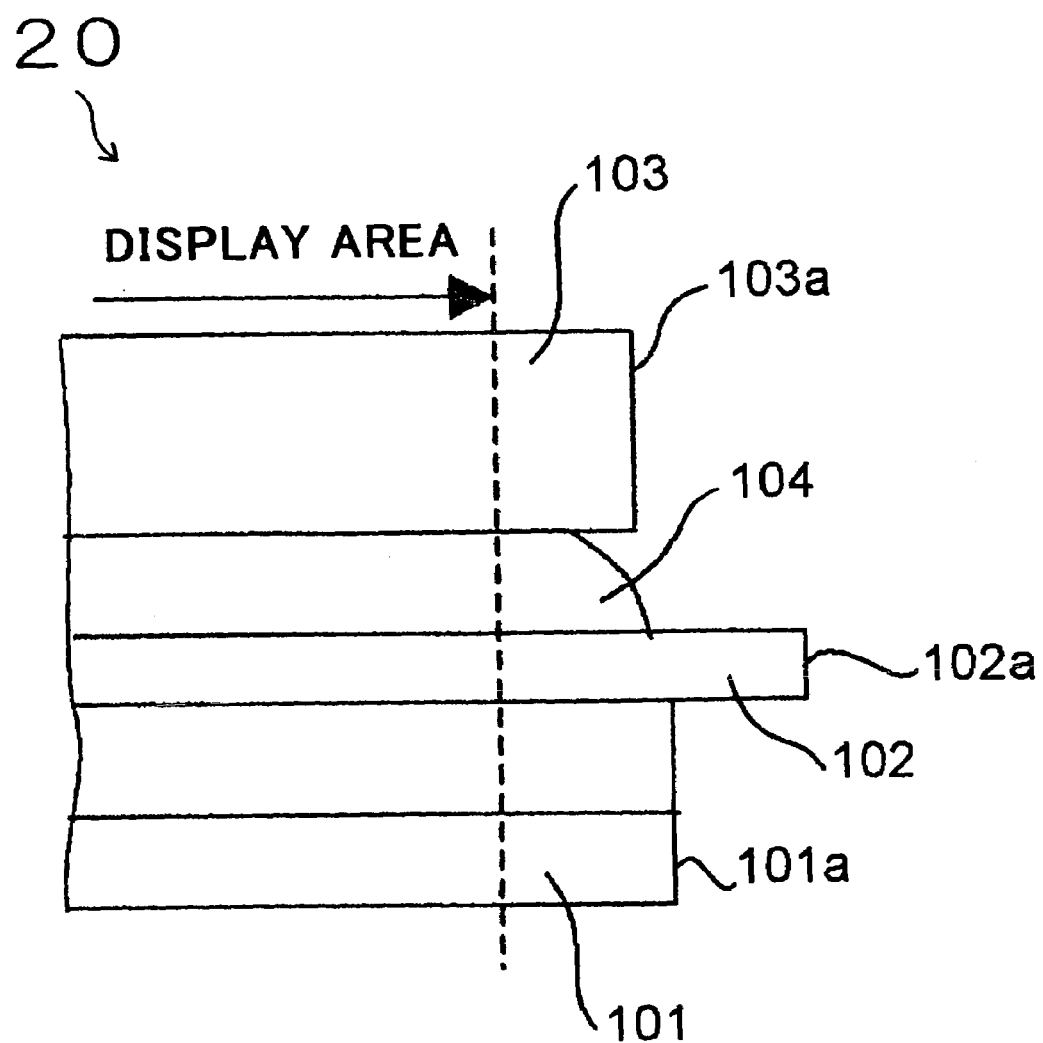
FIG. 7 is a partial cross-sectional view of a light-reflection type liquid crystal display in accordance with the second embodiment.

FIG. 7 is a partial cross-sectional view of a light-reflection type liquid crystal display device 20 in accordance with the second embodiment.

The polarizer 102 in the light-reflection type liquid crystal display device 20 is designed to have an edge 102a extending outwardly beyond an edge 103a of the light-guide 103.

Figure 3:
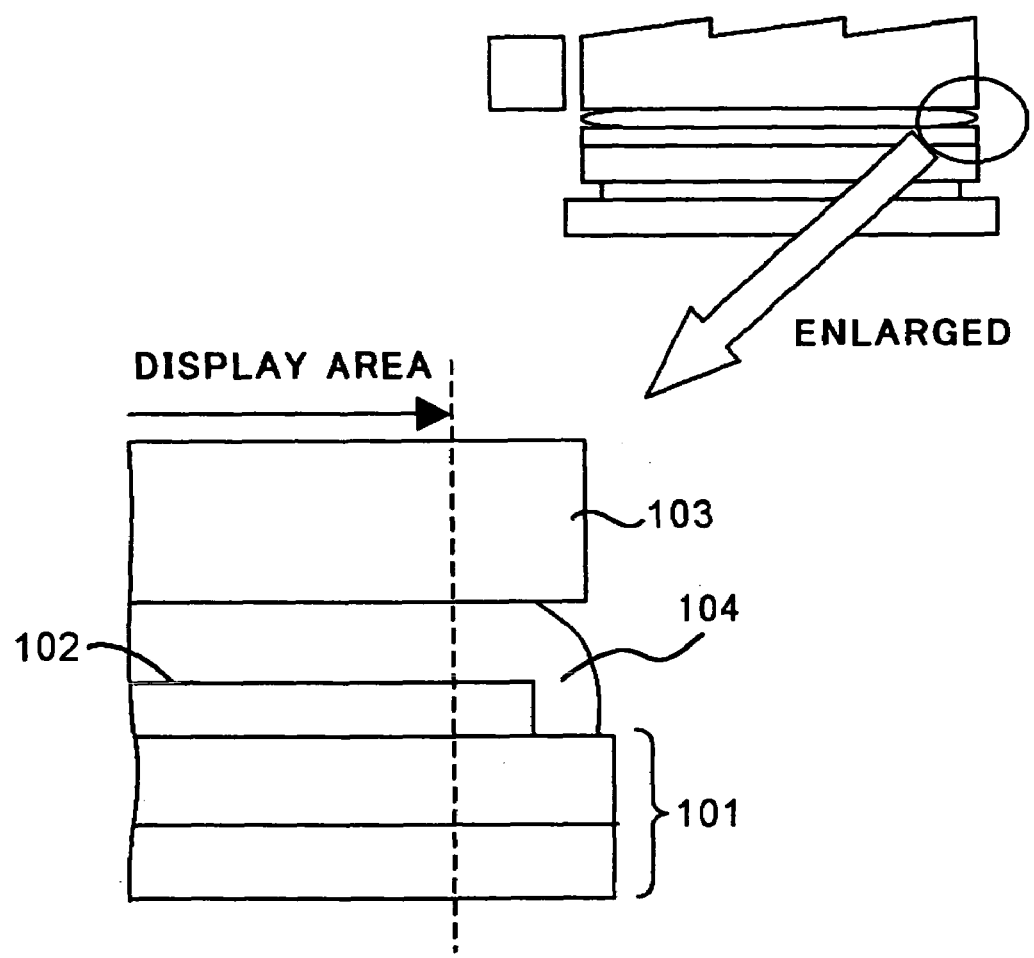
FIG. 3 is a partially enlarged cross-sectional view of the light-reflection type liquid crystal display device illustrated in FIG. 1.

As illustrated in FIG. 3, the conventional light-reflection type liquid crystal display device is accompanied with a problem that the resin 104 spreads beyond the polarizer 102 to the liquid crystal display panel 101, in which case, the resin 104 might be deformed at high or low temperature due to a difference in a linear expansion coefficient between the resin 104 and the liquid crystal display panel 101 composed of glass. As a result, the resin 104 might be peeled off at a portion at which the resin 104 is deformed.

In the light-reflection type liquid crystal display device 20 in accordance with the second embodiment, since the polarizer 102 has an edge 102a extending outwardly beyond an edge 103a of the light-guide 103, it is possible to prevent the resin 104 from spreading to the liquid crystal display panel 101, as illustrated in FIG. 7.

As a result, it is possible to prevent the resin 104 from being deformed due to a difference in a linear expansion coefficient between the resin 104 and the liquid crystal display panel 101, and hence, it is further possible to prevent the resin 104 from being peeled off at a portion at which the resin 104 is deformed.

In addition, since the resin 104 does not make contact with the liquid crystal display panel 101, if defectiveness is found in the liquid crystal display panel 101, for instance, it would be possible to peel the polarizer 102 off the liquid crystal display panel 101 and repair the liquid crystal display panel 101.

Instead of designing the polarizer 102 to have an edge 102a extending outwardly beyond an edge 103a of the light-guide 103, the polarizer 102 may be designed to have an edge 102a extending outwardly beyond an edge 101a of the liquid crystal display panel 101. By so designing the polarizer 102, it would be possible to prevent the resin 104 from spreading over the liquid crystal display panel 101.

Figure 8:
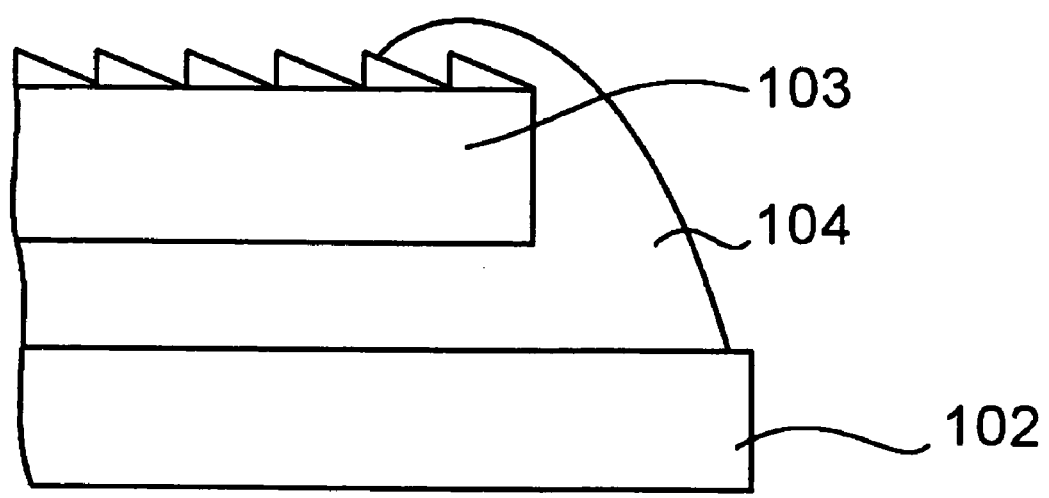
FIG. 8 is a partial cross-sectional view of a conventional light-reflection type liquid crystal display.

Even if the polarizer 102 is designed to have an edge 102a extending outwardly beyond an edge 103a of the light-guide 103, as illustrated in FIG. 8, the resin 104 might pour out of a gap between the polarizer 102 and the light-guide 103, and rise up to cover the light-guide 103 therewith, if the resin 104 is dropped onto the polarizer 102 in too excessive amount. If the resin 104 covers the light-guide 103 therewith, the light-guide 103 would loose its light-guiding function at a portion covered with the resin 104.

Figure 9:
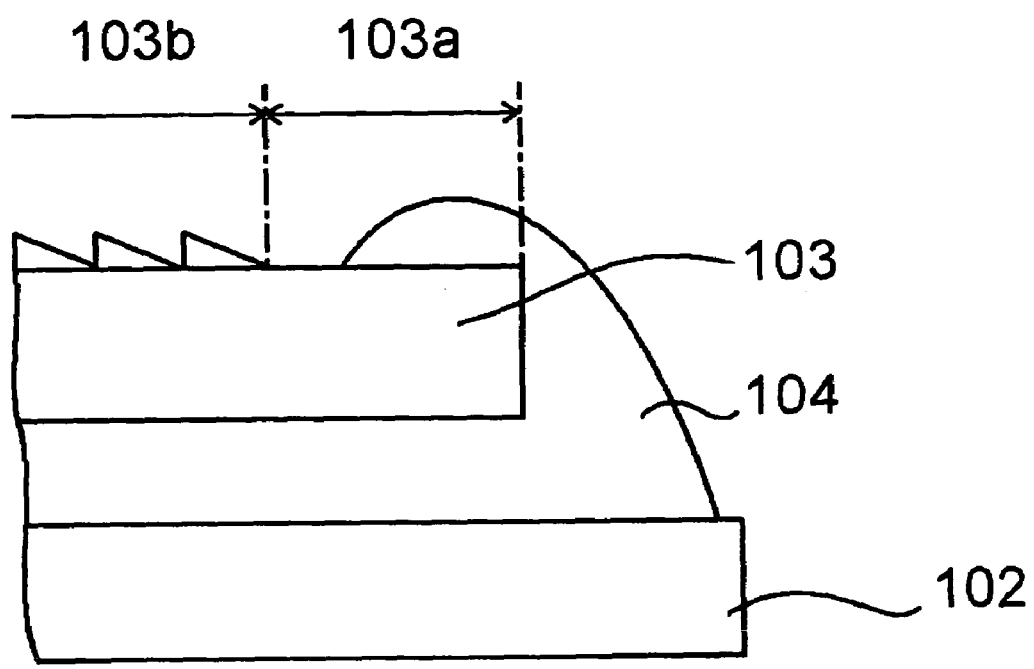
FIG. 9 is a partial cross-sectional view of the light-reflection type liquid crystal display in accordance with the second embodiment.

In order to avoid such a problem, as illustrated in FIG. 9, it is preferable that the light-guide 103 has a non-light-guiding area 103a at its outer marginal area.

Among an area of the light-guide 103, a light-guide area 103b through which light is actually guided is formed generally as a prism. Hence, the non-light-guiding area 103a may be formed to be a planar area in contrast with the prism-shaped light-guide area 103b.

Figure 10:
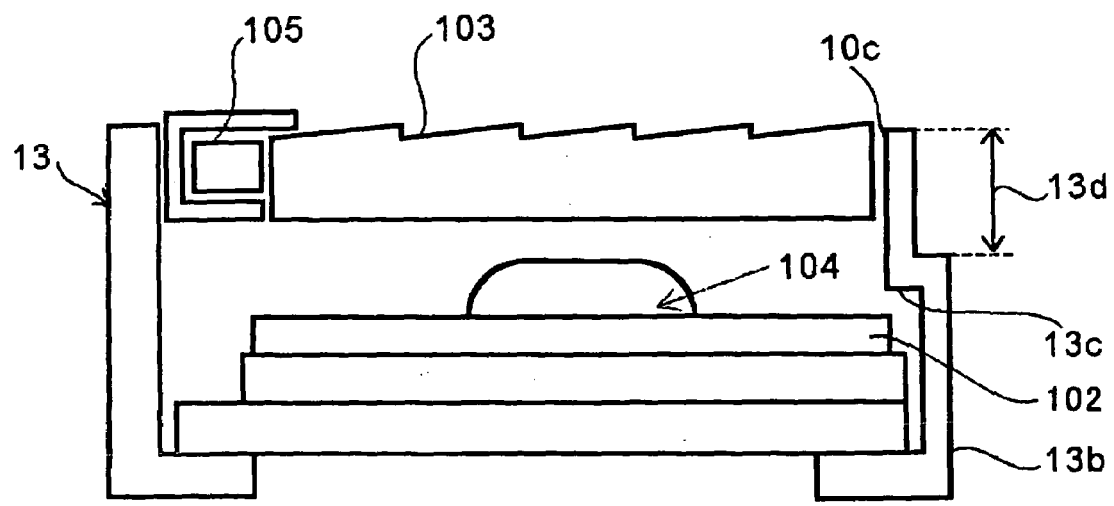
FIG. 10 is a cross-sectional view of the light-reflection type liquid crystal display in accordance with the second embodiment.

FIG. 10 is a cross-sectional view of a frame 13 used in a method of fabricating the light-reflection type liquid crystal display device 20 in accordance with the second embodiment.

The polarizer 102 in the second embodiment is designed to have the edge 102a extending outwardly beyond the edge 103a of the light-guide 103. Accordingly, if the frame 10 used in the first embodiment is used also for the light-reflection type liquid crystal display device 20, the polarizer 102 would interfere with the wall 10b of the wall 10.

Hence, as illustrated in FIG. 10, the frame 13 is formed at a wall 13b thereof with an outwardly projecting portion 13c such that the edge 102a of the polarizer 102 is in level with the outwardly projecting portion 13c when the polarizer 102 is accommodated in the frame 13. Thus, the polarizer 102 together with the liquid crystal display panel 101 can be accommodated into the frame 103, even if the polarizer 102 has the edge 102a extending outwardly beyond the edge 103a of the light-guide 103.

Figure 11:
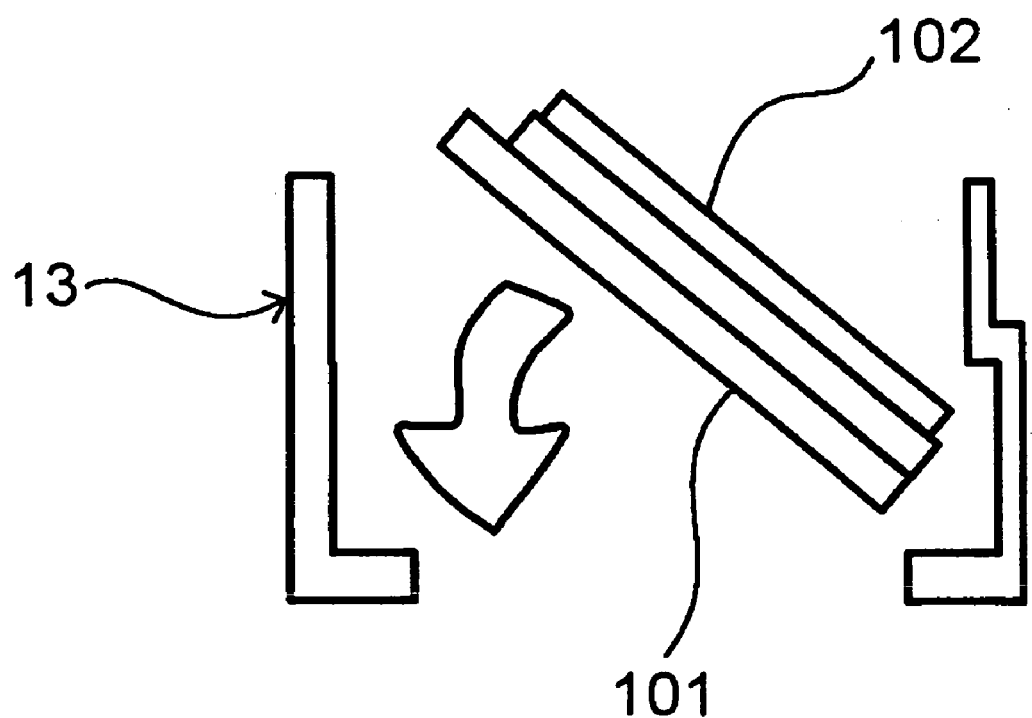
FIG. 11 illustrates how a liquid crystal display panel is accommodated into a frame in the light-reflection type liquid crystal display in accordance with the second embodiment.

When the polarizer 102 together with the liquid crystal display panel 101 is accommodated into the frame 103, as illustrated in FIG. 11, the liquid crystal display panel 101 is inclined, and then, the polarizer 102 is first accommodated at the edge 102a into the outwardly projecting portion 13c. Then, the liquid crystal display panel 101 is wholly laid onto the bottom 10a of the frame 13.

Since the frame 13 is designed to have the outwardly projecting portion 13c, the opening 10c is defined by a portion 13d of the wall 13b located above the outwardly projecting portion 13c.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2002-157419 filed on May 30, 2002 including specification, claims, drawings and summary is incorporated herein by reference in its entirety.

What is claimed is:

1. A light-reflection type liquid crystal display device comprising:
    (a) a liquid crystal display panel;
    (b) a polarizer mounted on said liquid crystal display panel;
    (c) a light-guide mounted on said polarizer;
    (d) a resin layer sandwiched between said polarizer and said light-guide for fixing said polarizer and said light-guide to each other; and
    (e) a light-source arranged adjacent to an end of said light-guide for supplying light to said light-guide,
    said polarizer having an edge extending outwardly beyond an edge of at least one of said light-guide and said liquid crystal display panel.

2. The light-reflection type liquid crystal display device as set forth in claim 1 further comprising:
    (f) a frame having a bottom and a wall defining an opening which has the same contour as that of said light-guide,
    said wall of said frame having an outwardly projecting portion such that said polarizer can be accommodated in said frame,
    said light-guide being positioned relative to said polarizer by being lowered along an inner wall of said frame through said opening onto said polarizer.

3. The light-reflection type liquid crystal display device as set forth in claim 2, wherein said opening is larger than a contour of said light-guide by a predetermined length.

4. The light-reflection type liquid crystal display device as set forth in claim 3, wherein said predetermined length is equal to a tolerance allowable when said liquid crystal display device panel and said light-guide are positioned relative to each other.

5. The light-reflection type liquid crystal display device as set forth in claim 2, wherein said liquid crystal display panel is comprised of two substrates adhered to each other through adhesive, said frame is formed at a bottom thereof with an opening, and an inner edge of said opening is located more outwardly than said adhesive.

6. The light-reflection type liquid crystal display device as set forth in claim 1: wherein
    said polarizer has an edge extending outwardly beyond an edge of said light-guide.

7. The light-reflection type liquid crystal display device as set forth in claim 6, wherein said light-guide has a non-light guide area along an outer edge thereof.

8. The light-reflection type liquid crystal display device as set forth in claim 1: wherein
    said polarizer has an edge extending outwardly beyond an edge of said liquid crystal display panel.

9. The light-reflection type liquid crystal display device as set forth in claim 8, wherein said light-guide has a non-light guide area along an outer edge thereof.

10. A light-reflection type liquid crystal display device comprising:
    (a) a liquid crystal display panel;
    (b) a polarizer mounted on said liquid crystal display panel;
    (c) a light-guide mounted on said polarizer;
    (d) a resin layer sandwiched between said polarizer and said light-guide for fixing said polarizer and said light-guide to each other; and
    (e) a light-source arranged adjacent to an end of said light-guide for supplying light to said light-guide,
    said polarizer having an edge extending outwardly beyond edges of said light-guide and said liquid crystal display panel.

* * * * *

UNITED STATES PATENT AND TRADEMARK OFFICE
CERTIFICATE OF CORRECTION

PATENT NO. : 7,119,860 B2
APPLICATION NO. : 11/101065
DATED : October 10, 2006
INVENTOR(S) : Fumihiko Fujishiro It is certified that error appears in the above-identified patent and that said Letters Patent is hereby corrected as shown below:

Item (73) on the Title page is deleted and the following is substituted:

(73) NEC LCD TECHNOLOGIES, LTD., Kanagawa (JP)

Signed and Sealed this

Twenty-seventh Day of November, 2007

JON W. DUDAS
*Director of the United States Patent and Trademark Office*